(12) United States Patent
Stadnyk

(10) Patent No.: US 10,029,548 B1
(45) Date of Patent: Jul. 24, 2018

(54) ADJUSTABLE AND REMOVABLE HARD TOP ROOF SYSTEM

(71) Applicant: Mark A. Stadnyk, Brooksville, FL (US)

(72) Inventor: Mark A. Stadnyk, Brooksville, FL (US)

( * ) Notice: Subject to any disclaimer, the term of this patent is extended or adjusted under 35 U.S.C. 154(b) by 2 days.

(21) Appl. No.: 15/285,102

(22) Filed: Oct. 4, 2016

Related U.S. Application Data

(60) Provisional application No. 62/238,327, filed on Oct. 7, 2015.

(51) Int. Cl.
  *B60J 7/08* (2006.01)
  *B60J 7/14* (2006.01)
  *B60J 7/10* (2006.01)
  *B60R 21/13* (2006.01)

(52) U.S. Cl.
  CPC ............... *B60J 7/143* (2013.01); *B60J 7/108* (2013.01); *B60R 21/13* (2013.01); *B60R 2021/132* (2013.01)

(58) Field of Classification Search
  CPC .. B62D 25/06; B62D 25/04; B60J 7/11; B60J 1/1823; B60J 7/106; B60J 1/085; B60J 7/145; E04B 1/34321; E04D 15/06
  USPC ........................................................ 296/108
  See application file for complete search history.

(56) References Cited

U.S. PATENT DOCUMENTS

| | | | | |
|---|---|---|---|---|
| 2,768,024 A | * | 10/1956 | Spear, Jr. | B60J 7/028 296/107.07 |
| 2,768,025 A | * | 10/1956 | Spear, Jr. | B60J 7/028 296/117 |
| 2,856,231 A | * | 10/1958 | Zeman | B60J 7/026 114/361 |
| 2,919,156 A | * | 12/1959 | Dodge | B62D 33/0621 296/108 |
| 3,575,464 A | * | 4/1971 | Himka | B60J 7/145 296/117 |
| 5,031,949 A | * | 7/1991 | Sorimachi | B60J 7/04 296/216.04 |
| 5,074,614 A | * | 12/1991 | Stefanski | B60J 7/026 296/102 |
| 5,429,409 A | * | 7/1995 | Corder | B60J 7/146 296/108 |
| 6,010,178 A | * | 1/2000 | Hahn | B60J 7/203 296/107.08 |
| 6,135,535 A | * | 10/2000 | Tarahomi | B60J 7/106 296/102 |

(Continued)

*Primary Examiner* — Kiran B Patel

(57) ABSTRACT

A vehicle has a forward end and a rearward end with a passenger compartment there between. The passenger compartment has a floor below, a steering wheel forwardly, and two laterally spaced roll bars rearwardly. A support platform is fixedly positioned above the passenger compartment. A forward support rail is between the floor and the support platform. A rearward support plate has lateral edges coupled to the roll bars. A left roof section has a left front and a left back. A right roof section has a right front and a right back. The left and right roof sections rest upon the support platform when in a lowered operative orientation. A hinge assembly couples the left back and the right back to the support platform for independent movement of the left and right roof sections between the lowered operative orientation forwardly and the raised inoperative orientation rearwardly.

8 Claims, 8 Drawing Sheets

(56) References Cited

U.S. PATENT DOCUMENTS

| | | | | |
|---|---|---|---|---|
| 6,312,042 B1* | 11/2001 | Halbweiss | B60J 7/028 | 296/107.16 |
| 6,585,310 B1* | 7/2003 | Guillez | B60J 1/1823 | 296/107.01 |
| 6,641,201 B1* | 11/2003 | Pietryga | B60J 7/041 | 296/100.01 |
| 6,702,363 B2 | 3/2004 | Tohda | B60J 7/10 | 296/107.17 |
| 6,729,672 B2* | 5/2004 | Neubrand | B60J 7/145 | 296/107.07 |
| RE38,546 E* | 7/2004 | Corder | B60J 7/201 | 296/108 |
| 6,866,327 B2* | 3/2005 | Willard | B60J 7/202 | 296/107.08 |
| 6,976,725 B2* | 12/2005 | Guillez | B60J 7/145 | 296/107.17 |
| 7,080,873 B2* | 7/2006 | Queveau | B60J 7/145 | 296/107.17 |
| 7,152,905 B2* | 12/2006 | Queveau | B60J 1/1823 | 296/108 |
| 7,712,817 B2* | 5/2010 | Meinert | B60J 7/145 | 296/107.07 |
| 7,722,103 B2* | 5/2010 | Brandel | B60J 7/148 | 296/107.17 |
| 7,758,101 B2* | 7/2010 | Schroder | B60J 7/145 | 296/107.17 |
| 7,789,449 B2* | 9/2010 | Guckel | B60J 7/145 | 296/107.07 |
| 7,866,726 B2* | 1/2011 | Neubrand | B60J 7/146 | 296/107.17 |
| 7,963,584 B2* | 6/2011 | Odoi | B60J 1/1823 | 296/108 |
| 7,967,365 B2* | 6/2011 | Gerhardt | B60J 7/026 | 280/756 |
| 8,789,871 B2* | 7/2014 | Armbruster | B60J 7/202 | 296/107.08 |
| 9,457,644 B2* | 10/2016 | Bowles | B60J 7/1265 | |
| 2001/0042992 A1* | 11/2001 | Obendiek | B60J 1/1823 | 296/107.17 |
| 2003/0038502 A1* | 2/2003 | Marold | B60J 7/061 | 296/107.18 |
| 2003/0164622 A1* | 9/2003 | De Gaillard | B60P 3/40 | 296/26.09 |
| 2004/0140689 A1* | 7/2004 | Wagner | B60J 7/04 | 296/100.06 |
| 2007/0194594 A1* | 8/2007 | Heselhaus | B60J 7/1265 | 296/107.01 |
| 2014/0138983 A1* | 5/2014 | Haberkamp | B60J 7/1858 | 296/107.09 |
| 2016/0046241 A1* | 2/2016 | Crismon | B60J 7/106 | 224/326 |
| 2018/0037097 A1* | 2/2018 | Haynes | B60J 7/104 | |

\* cited by examiner

FIG. 5
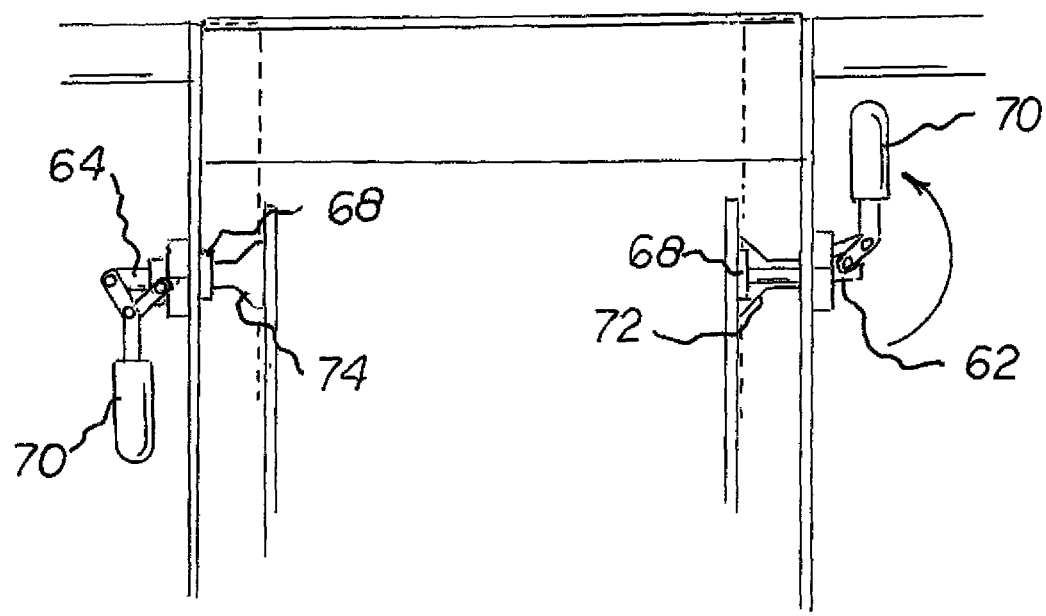
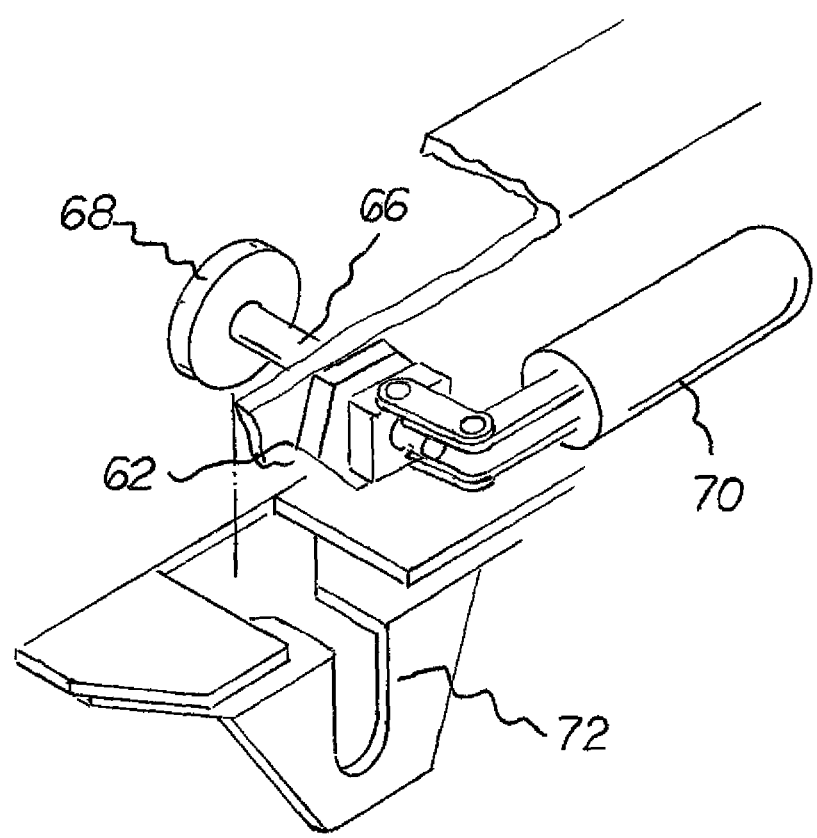
FIG. 6

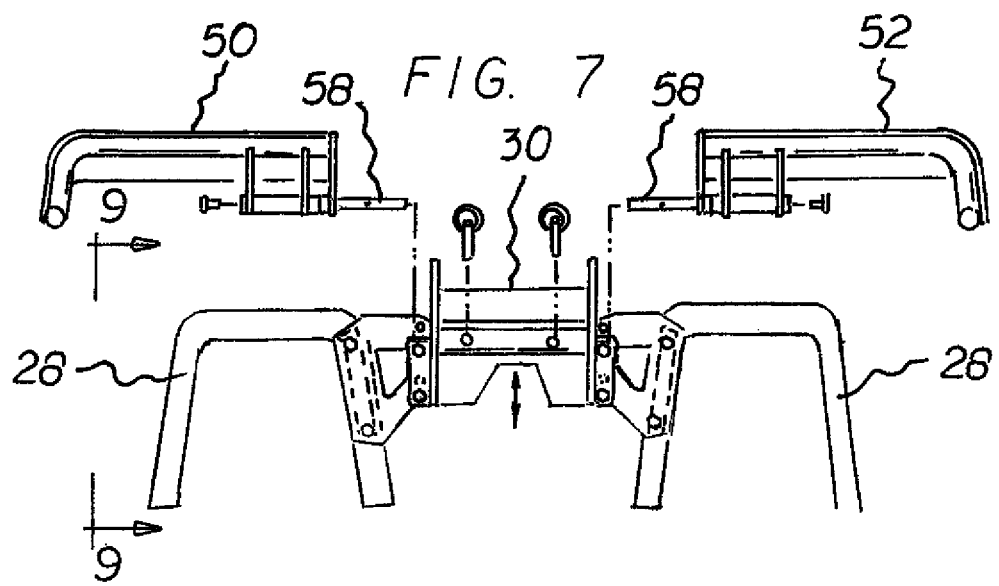
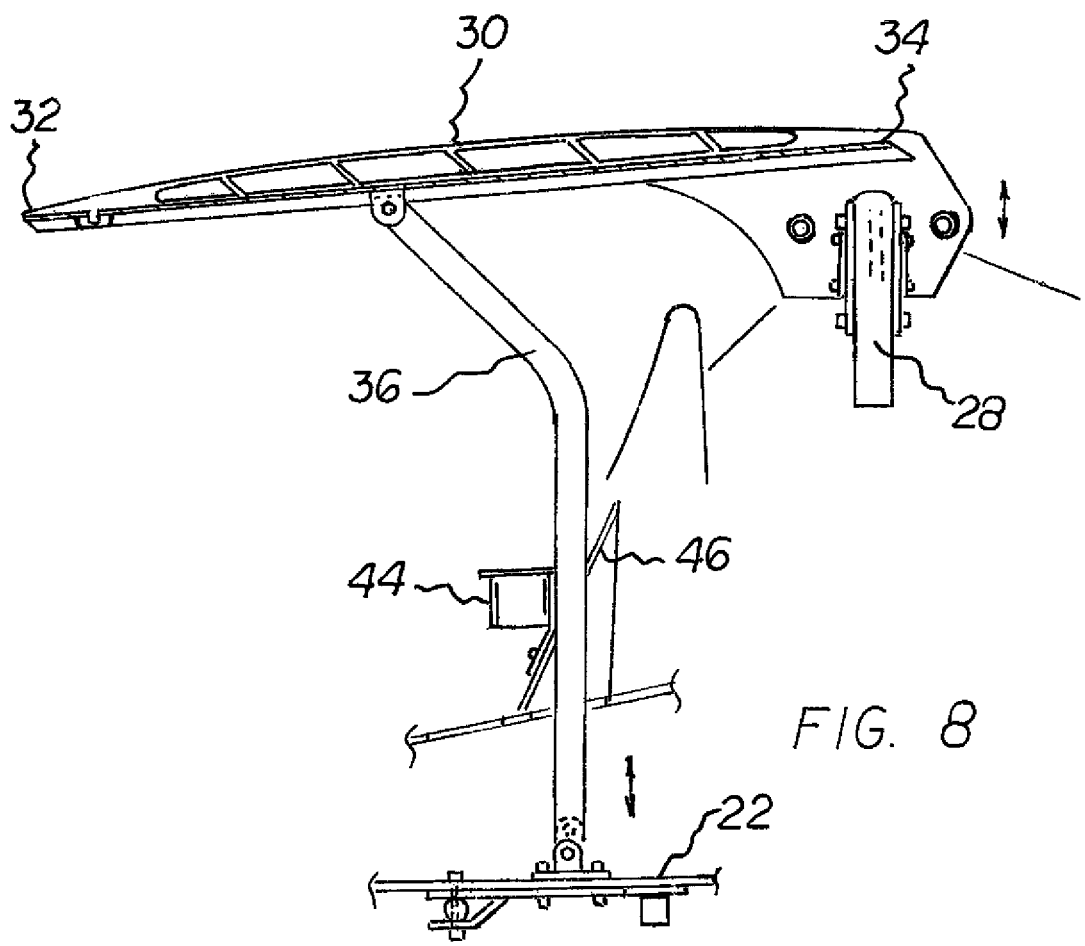

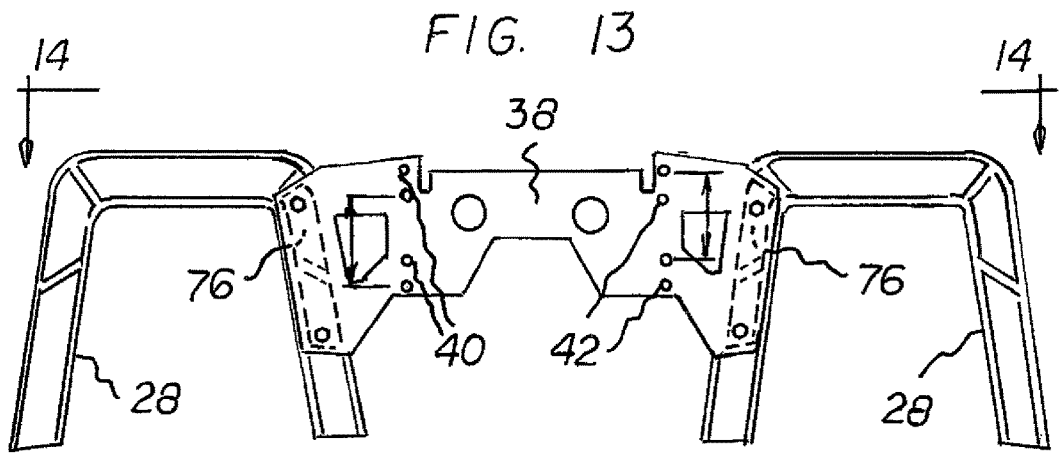
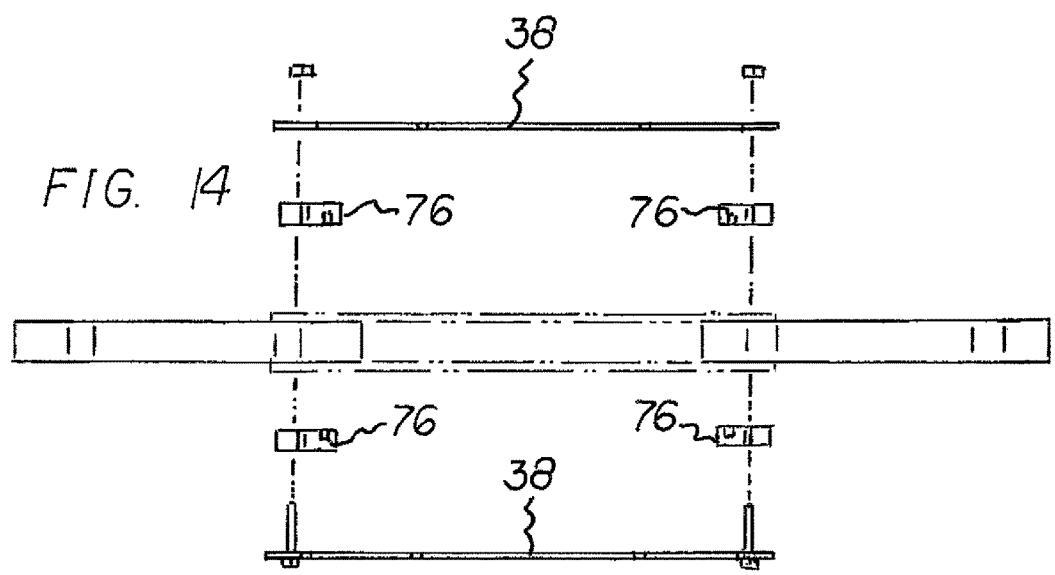
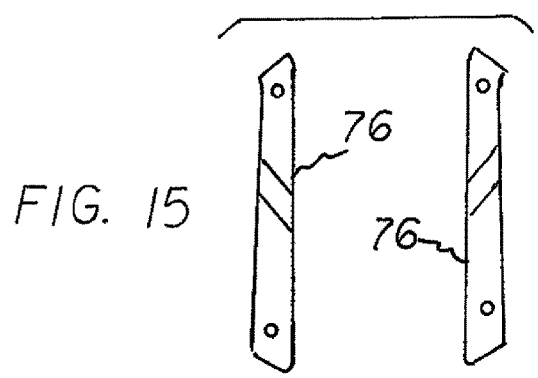

ADJUSTABLE AND REMOVABLE HARD TOP ROOF SYSTEM

RELATED APPLICATION

This application is based upon and claims priority of Provisional Application No. 62/238,327 filed Oct. 7, 2015, the subject matter of which is incorporated herein by reference.

BACKGROUND OF THE INVENTION

Field of the Invention

The present invention relates to an adjustable and removable hard top roof system and more particularly pertains to an adjustable and removable hard top roof system for motorcycles and autos movable between an operative orientation over a driver and a passenger and a remote inoperative orientation.

Description of the Prior Art

The use of convertible tops is known in the prior art. More specifically, convertible tops previously devised and utilized for the purpose of selectively covering and uncovering drivers and passengers are known to consist basically of familiar, expected, and obvious structural configurations, notwithstanding the myriad of designs encompassed by the crowded prior art which has been developed for the fulfillment of countless objectives and requirements.

While these devices fulfill their respective, particular objectives and requirements, they do not describe an adjustable and removable hard top roof system that allows removable'hard top roof systems for motorcycles and autos to be movable between an operative orientation over a driver and a remote inoperative orientation.

One of the key features of the present invention is the ability of the user to adjust the height of the roof via multiple mounting positions. This is a substantial departure from all other hard or soft top roofs which are fixed on one place, immobile, and not adjustable for height.

In this respect, the adjustable and removable hard top roof system according to the present invention substantially departs from the conventional concepts and designs of the prior art, and in doing so provides an apparatus primarily developed for the purpose of providing an adjustable and removable hard top roof system for motorcycles and autos movable between an operative orientation over a driver and a passenger and a remote inoperative orientation.

Therefore, it can be appreciated that there exists a continuing need for a new and improved removable hard top roof system which can be used for providing adjustable and removable hard top roof systems for motorcycles and autos movable between an operative orientation over a driver and a passenger and a remote inoperative orientation. In this regard, the present invention substantially fulfills this need.

SUMMARY OF THE INVENTION

In view of the disadvantages inherent in the known types of convertible tops now present in the prior art, the present invention provides an improved removable hard top roof system. As such, the general purpose of the present invention, which will be described subsequently in greater detail, is to provide a new and improved adjustable and removable hard top roof system which has all the advantages of the prior art and none of the disadvantages.

This hard top roof is both completely removable and at the same time reversible, movable to a remote inoperative orientation, which sets it apart from other convertible and hard top designs. It also has the ability to open partially for improved ingress and egress into the vehicle and does so independently for driver and passenger. This is a feature not previously available on any car or motorcycle roof.

To attain this, from a broad perspective, the present invention essentially comprises an adjustable and removable hard top roof system for a vehicle, a vehicle of the type having a forward end and a rearward end with a passenger compartment there between. The passenger compartment has a floor below, a steering wheel forwardly, and two laterally spaced roll bars rearwardly. A support platform is fixedly positioned above the passenger compartment. A forward support rail is between the floor and the support platform. A rearward support plate has lateral edges coupled to the roll bars. A left roof section has a left front and a left back. A right roof section has a right front and a right back. The left and right roof sections rest upon the support platform when in a lowered operative orientation. A hinge assembly couples the left back and the right back to the support platform for independent movement of the left and right roof sections between the lowered operative orientation forwardly and the raised inoperative orientation rearwardly.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved adjustable and removable hard top roof system which has all of the advantages of the prior art convertible tops and none of the disadvantages.

It is another object of the present invention to provide a new and improved removable hard top roof system which may be easily and efficiently manufactured and marketed.

It is a further object of the present invention to provide a new and improved adjustable and removable hard top roof system which is of durable and reliable constructions.

An even further object of the present invention is to provide a new and improved adjustable and removable hard top roof system which is susceptible of a low cost of manufacture with regard to both materials and labor, and which accordingly is then susceptible of low prices of sale to the consuming public, thereby making such adjustable and removable hard top roof system economically available to the buying public.

Lastly, it is an object of the present invention to provide an adjustable and removable hard top roof system for providing an adjustable and removable hard top roof system for motorcycles and autos movable between an operative orientation over a driver and a passenger and a remote inoperative orientation.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a bottom view taken along line 5-5 of FIG. 4.

FIG. 6 is a perspective illustration of one of the locking assemblies of FIG. 5.

FIG. 7 is an exploded front elevational view of the roll bars and the support plate.

FIG. 8 is a side elevational view of the support platform and its supporting components.

FIG. 13 is a front elevational View of the roll bars and the support plate.

FIG. 14 is an exploded plan view taken along line 14-14 Of FIG. 13.

FIG. 15 is a plan view of the two fillers for the gaps of the roll bars.

The same reference numerals refer to the same parts throughout the various Figures.

DESCRIPTION OF THE PREFERRED EMBODIMENT

Figure 1:
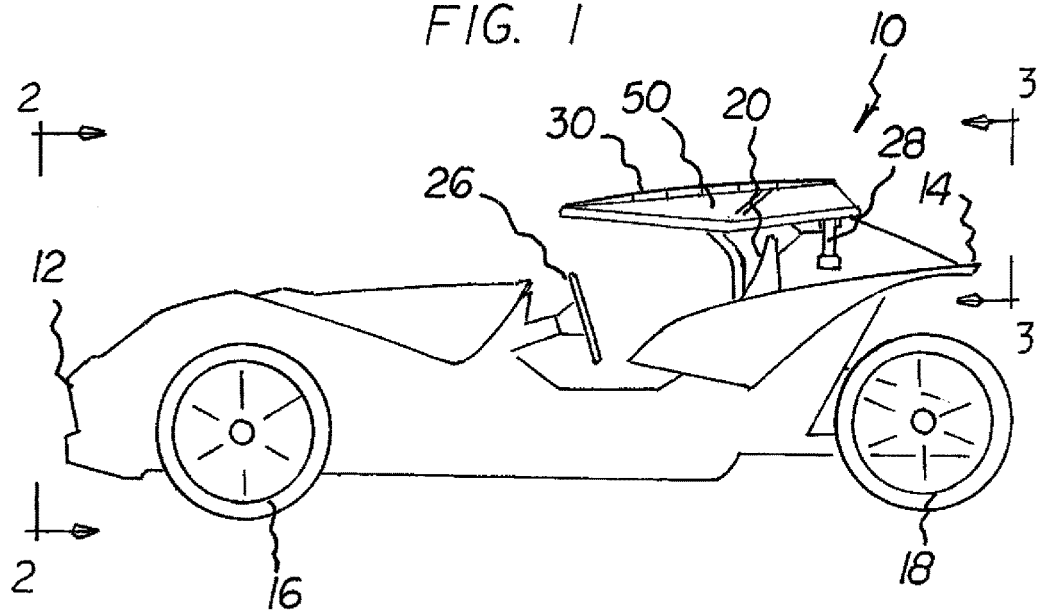
FIG. 1 is a side elevational view of an adjustable and removable hard top roof system for motorcycles and autos constructed in accordance with the principles of the present intention.
Figure 2:
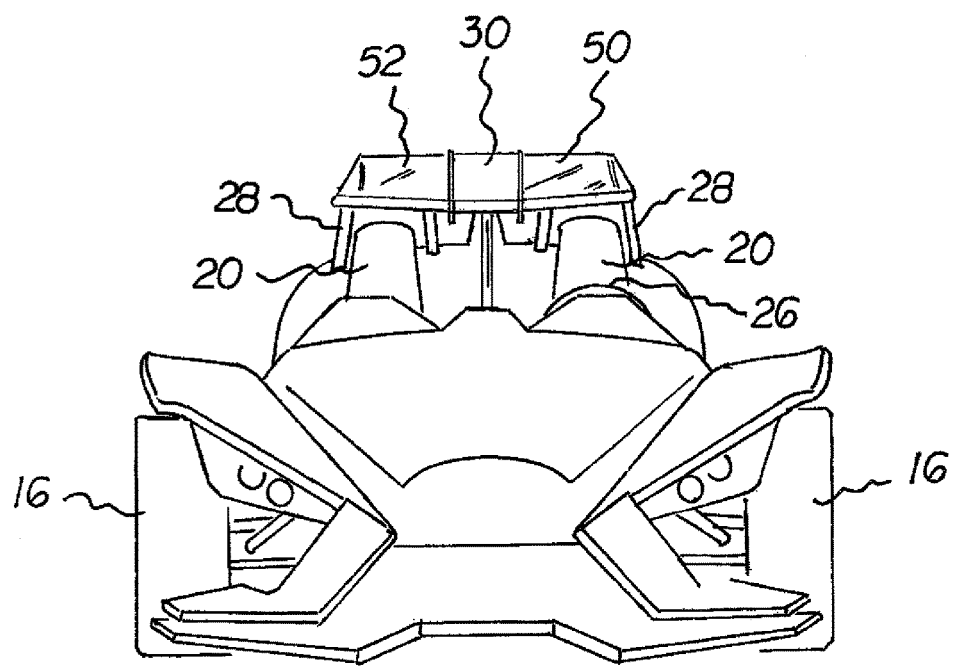
FIG. 2 is a front elevational view taken along line 2-2 of FIG. 1.
Figure 3:
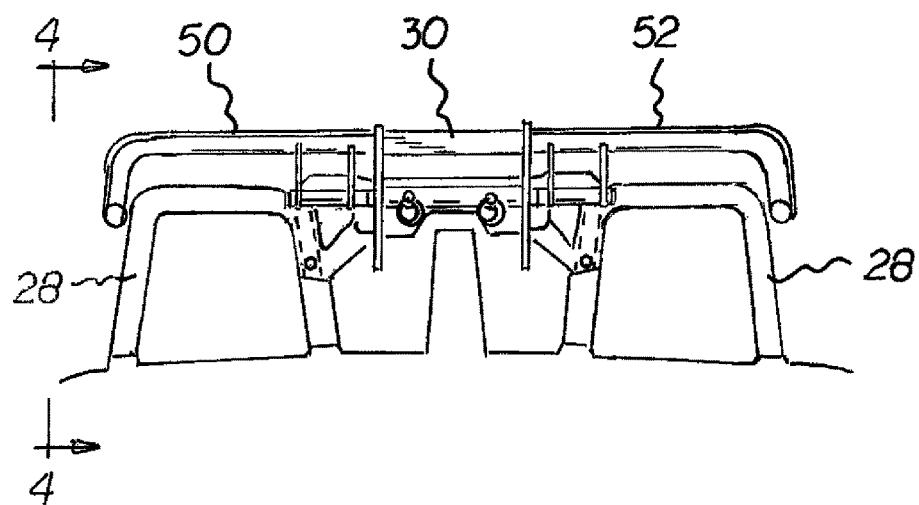
FIG. 3 is a rear elevational view taken along line 3-3 of FIG. 1.
Figure 4:
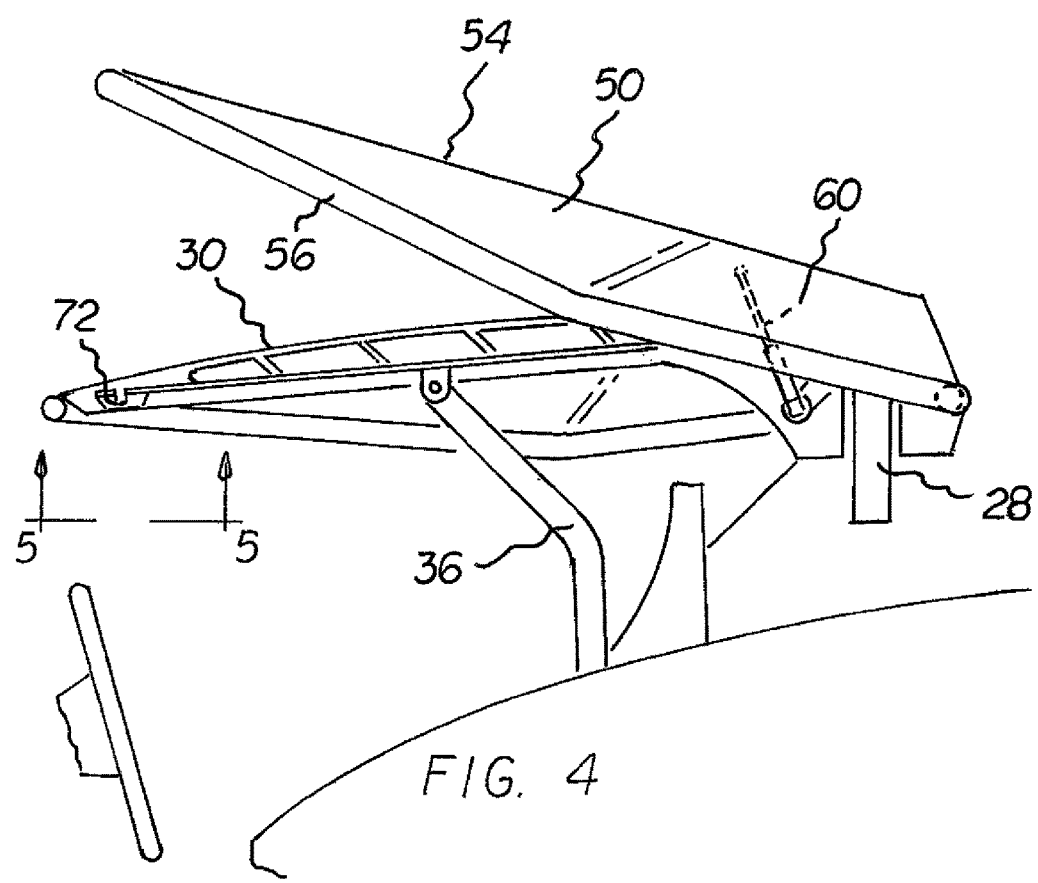
FIG. 4 is a side perspective illustration taken along line 4-4 of FIG. 3.
Figure 9:
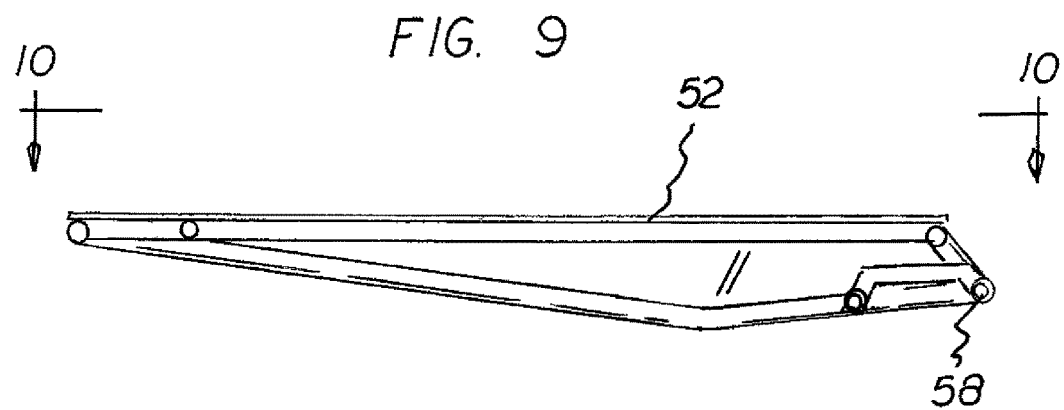
FIG. 9 is a side elevational view of one of the roof sections.
Figure 10:
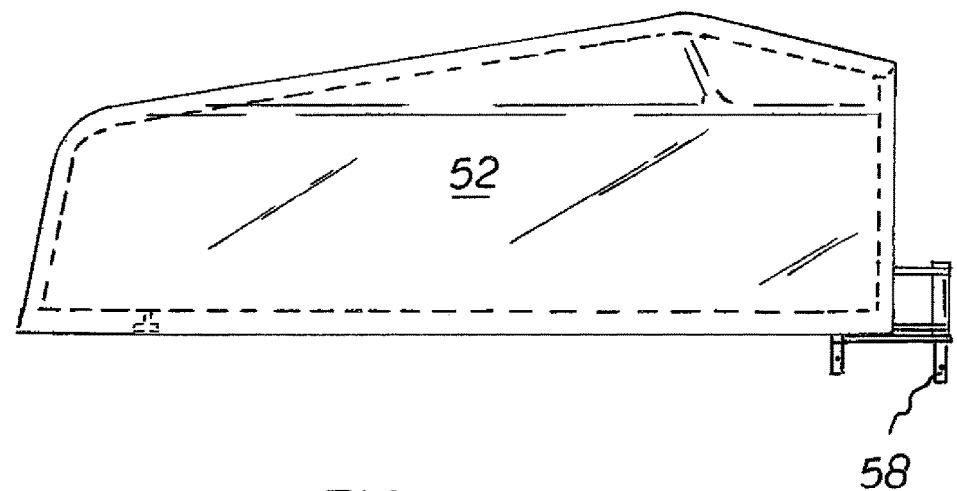
FIG. 10 is a plan view taken along line 10-10 of FIG. 9.
Figure 11:
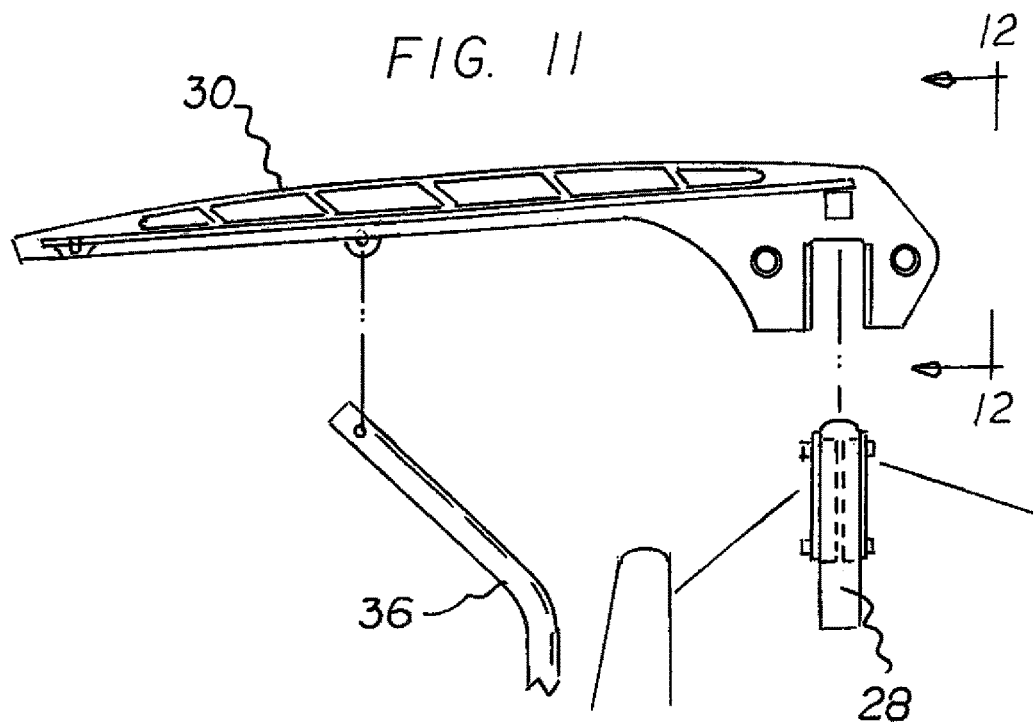
FIG. 11 is an exploded side elevational view of the support platform and its supporting components.
Figure 12:
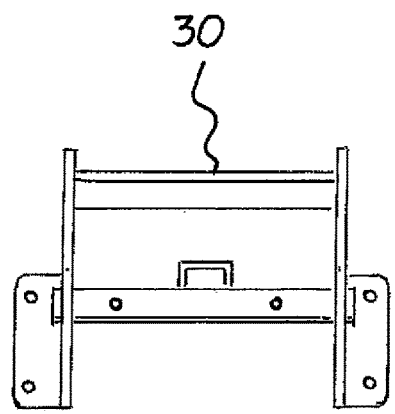
FIG. 12 is a rear elevational view taken along line 12-12 of FIG. 11.
Figure 16:
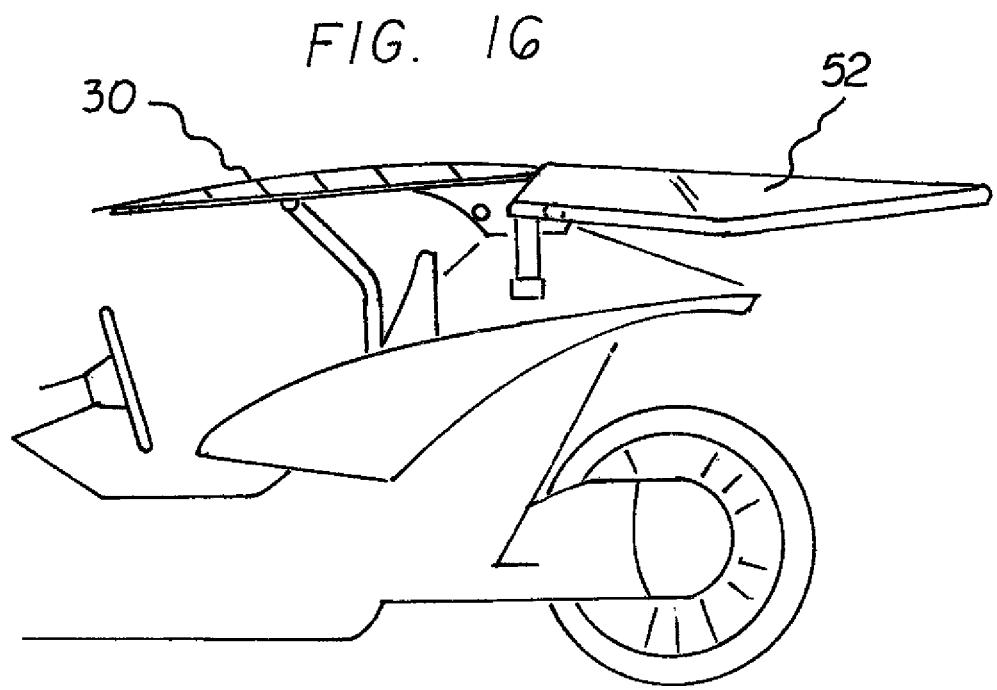
FIG. 16 is a side elevational view with the roof panels in the inoperative orientation.

With reference now to the drawings, and in particular to FIG. 1 thereof, the preferred embodiment of the new and improved adjustable and removable hard top roof system embodying the principles and concepts of the present invention and generally designated by the reference numeral 10 will be described.

The present invention, the adjustable and removable hard top roof system is comprised of a plurality of components. Such components in their broadest context include a vehicle with two roll bars, a support platform, a forward support rail, a rearward support plate, left and right roof sections, and a hinge assembly. Such components are individually configured and correlated with respect to each other so as to attain the desired objective.

From a specific perspective, the invention of the present application is an adjustable and removable hard top roof system 10 for motorcycles and autos wherein a roof is movable in sections between a forward operative orientation and a rearward inoperative orientation. Movement of the roof system is done in a safe, convenient, and economical manner. The system includes a forward end 12 and a rearward end 14. The forward end has two laterally spaced front wheels 16. The rearward end has one rear wheel 18.

A passenger compartment has two laterally spaced seats 20 between the front wheels and the rear wheels. The passenger compartment has a floor 22 below the seats, and a steering wheel 26 forwardly of one of the seats, and two roll bars 28 laterally spaced behind the seats with the seats between the roll bars.

A support platform 30 is fixedly oriented above the passage compartment between the seats with a forward end 32 forwardly of the seats and a rearward end 34 rearwardly of the seats. A forward support rail 36 is positioned between the floor and a central extent of the support platform. A rearward double support plate 38 has lateral edges coupled to the roll bars. The rearward support plate has plural sets of attachment holes 40, 42 to allow coupling at any of a plurality of elevations. Further, such components constitute components to vary the elevational height of the support platform and the left and right roof sections.

The roof and the forward support rail create no forward or lateral obstructions visually whereby a driver and passenger have an unobstructed view of the toad while driving.

A supplemental cup holder 44 is attached to the forward support rail. A decorative plate 46 is secured to the forward support rail beneath the supplemental cup holder to obscure a removed original cup holder.

A left roof section 50 and a similarly configured right roof section has a linear interior edge 56 at least a portion of an exterior wider rearwardly and narrow forwardly. The interior edges of the left and right roof sections rest horizontally upon the support platform when in the operative orientation.

A hinge assembly 58 couples the rearward end of the left and right roof sections for independent movement between the operative orientation forwardly and the inoperative orientation rearwardly.

A shock absorber 60 functioning as a lift support is operatively coupled between each roof section and the support platform to abate rapid lowering of each roof section to the support platform. The shock absorbers also function to support each roof section in an open upright orientation for easier access into and out of the passenger compartment. Such construction provides the ability to open the left and right roof sections partially for improved ingress and egress into and from the passenger compartment and does so independently for the driver and the passenger.

Lastly provided are a left lock assembly 62 and a right lock assembly 64. The left lock assembly has a left pivotable section and a left fixed section. The left pivotable section depends from the left roof section and is formed with an axially shiftable left pin 66 having a cylindrical left head 68 interiorly. The left pivotable section has a pivotable handle 70 exteriorly for reciprocating the left head. The left fixed section has a left lock receptor 72 depending from the support platform adjacent to the cylindrical left head to secure the left roof section when in the lowered operative orientation. The right lock assembly has a right pivotable section and a right fixed section. The right pivotable section depends from the right roof section and is formed with an axiallty shiftable right pin having a cylindrical right head interiorly. The right pivotable section has a pivotable handle exteriorly for reciprocating the right head. The right fixed section has a right lock receptor 74 depending from the support platform adjacent to the cylindrical right head to secure the right roof panel when in the lowered operative orientation.

Figure 17:
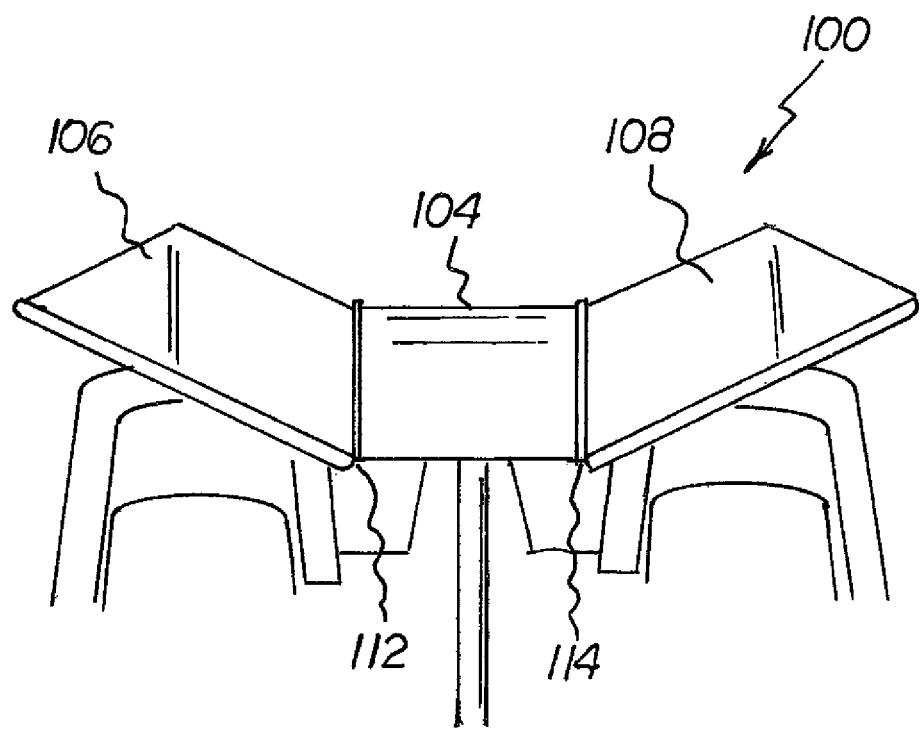
FIG. 17 is a front elevational view illustrating an alternate embodiment of the invention.

FIG. 17 illustrates an alternate embodiment of the invention. In such embodiment, the system 100 includes roof panels 106, 108 which pivot about the support platform 104 with axles 112, 114. Such axles have parallel, laterally offset, axes of rotation.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An adjustable and removable hard top roof system comprising:
    a vehicle having a forward end and a rearward end with a passenger compartment there between, the passenger compartment having a floor below, and a steering wheel forwardly, and two laterally spaced roll bars rearwardly;
    a support platform fixedly positioned above the passage compartment, a forward support rail between the floor and the support platform, a rearward support plate having lateral edges coupled to the roll bars;
    a left roof section with a left front and a left back, a right roof section with a right front and a right back, the left and right roof sections resting upon the support platform when in a lowered operative orientation; and
    a hinge assembly coupling the left back and the right back to the support platform for independent movement of the left and right roof sections between the lowered operative orientation forwardly and the raised inoperative orientation rearwardly.

2. The system asset forth in claim 1 and further including components to vary the elevational height of the support platform and the left and right roof sections.

3. The system asset forth in claim 1 and further including a left lock assembly and a right lock assembly, the left lock assembly having a left pivotable section and a left fixed section, the left pivotable section depending from the left roof section and being formed with an axially shiftable left pin having a cylindrical left head interiorly, the left pivotable section having a pivotable handle exteriorly for reciprocating the left head, the left fixed section having a left lock receptor depending from the support platform adjacent to the cylindrical left head to secure the left roof section when in the lowered operative orientation, the right lock assembly having a right pivotable section and a right fixed section, the right pivotable section depending from the right roof section and being formed with an axiallty shiftable right pin having a cylindrical right head interiorly, the right pivotable section having a pivotable handle exteriorly for reciprocating the right head, the right fixed section having a right lock receptor depending from the support platform adjacent to the cylindrical right head to secure the right roof panel when in the lowered operative orientation.

4. The system as set forth in claim 1 and further including a shock absorber operatively coupled between each roof section and the support plate to abate rapid lowering of each roof section to the support platform.

5. The system as set forth in claim 4 wherein the shock absorber provides the ability to open the left and right roof sections partially for improved ingress and egress into and from the passenger compartment and does so independently for driver and passenger.

6. The system as set forth in claim 1 wherein the roof and the forward support rail create no forward or lateral obstructions visually whereby a driver and passenger have an unobstructed view of the road while driving.

7. The system as set forth in claim 1 wherein the roof panels pivot about axles which have co-extensive axes of rotation.

8. The system (100) as set forth in claim 1 wherein the roof panels (106)(108) pivot about the support platform (104) with axles (112)(114) which have parallel, laterally offset, axes of rotation.

* * * * *